March 17, 1970  L. J. VEILLETTE  3,501,664
ANGULAR POSITION AND VELOCITY SENSING APPARATUS
Filed July 28, 1967  6 Sheets-Sheet 1

INVENTOR
LEO J. VEILLETTE

BY
ATTORNEYS

For sensor of Fig. 4

| θ | 0 | 15° | 30° | 45° | 60° | 75° | 90° |
|---|---|---|---|---|---|---|---|
| V₁ | 0 | 1 | 1 | 0 | 0 | 0 | 0 |
| V₂ | 0 | 0 | 1 | 1 | 0 | 0 | 0 |
| V₃ | 0 | 0 | 0 | 1 | 1 | 0 | 0 |
| V₄ | 0 | 0 | 0 | 0 | 1 | 1 | 0 |
| V₅ | 1 | 0 | 0 | 0 | 0 | 1 | 1 |
| V₆ | 1 | 1 | 0 | 0 | 0 | 0 | 1 |

Fig. 7B

For sensor of Fig. 6

Group A:

| V₁ | 0 1 1 1 1 0 0 0 0 0 0 0 1 1 1 1 0 0 0 0 0 0 0 |
| V₂ | 0 0 0 1 1 1 1 0 0 0 0 0 0 0 1 1 1 1 0 0 0 0 0 |
| V₃ | 0 0 0 0 0 1 1 1 1 0 0 0 0 0 0 0 1 1 1 1 0 0 0 |
| V₄ | 0 0 0 0 0 0 0 1 1 1 1 0 0 0 0 0 0 0 1 1 1 1 0 |
| V₅ | 1 0 0 0 0 0 0 0 0 1 1 1 1 0 0 0 0 0 0 0 1 1 1 |
| V₆ | 1 1 1 0 0 0 0 0 0 0 0 1 1 1 1 0 0 0 0 0 0 0 1 |

Group B:

| V₁' | 0 0 1 1 1 1 0 0 0 0 0 0 0 1 1 1 1 0 0 0 0 0 0 |
| V₂' | 1 1 1 1 0 0 0 0 0 0 0 1 1 1 1 0 0 0 0 0 0 0 1 |
| V₃' | 0 0 0 0 0 0 1 1 1 1 0 0 0 0 0 0 0 1 1 1 1 0 0 0 |
| V₄' | 0 0 0 0 1 1 1 1 0 0 0 0 0 0 0 1 1 1 1 0 0 0 0 |
| V₅' | 1 1 0 0 0 0 0 0 0 1 1 1 1 0 0 0 0 0 0 0 1 1 1 |
| V₆' | 0 0 0 0 0 0 0 1 1 1 1 0 0 0 0 0 0 0 1 1 1 1 0 |

θ: 0, 15°, 30°, 45°, 60°, 75°, 90°

INVENTOR
LEO J. VEILLETTE

BY
ATTORNEYS

INVENTOR
LEO J. VEILLETTE

BY

ATTORNEYS

United States Patent Office

3,501,664
Patented Mar. 17, 1970

3,501,664
ANGULAR POSITION AND VELOCITY SENSING
APPARATUS
Leo J. Veillette, Lanham, Md., assignor to the United
States of America as represented by the Administrator
of the National Aeronautics and Space Administration
Filed July 28, 1967, Ser. No. 656,953
Int. Cl. H02p 7/28
U.S. Cl. 318—138                    18 Claims

ABSTRACT OF THE DISCLOSURE

A system is disclosed for regulating brushless DC motors of the type where an internal stator field is rotated in space 90° ahead of the rotor field. To maintain the correct spatial relation between the stator and rotor fields, the angular position of the rotor is continually sensed and the position indication is used to continually change the stator field orientation as the rotor rotates. The rate of rotation of the rotor is also determined to provide controlled-damping and rate-limiting of the motor.

---

The invention described herein was made by an employee of the United States government and may be manufactured and used by or for the government for governmental purposes without the payment of any royalties thereon or therefor.

A magnetic sensor for detecting both the position and rate of rotation of the DC motor rotor is employed. The sensor includes an easily magnetizable rotor having a plurality of poles disposed around the periphery thereof, the sensor rotor being mounted on the same shaft as that for the motor rotor. The sensor structure also includes an easily magnetizable stator having a plurality of teeth disposed along the inner periphery, none of the teeth being diametrically opposite any of the others. Connected to the stator is a primary winding of two individual wound sections, and connected to each of the teeth is a secondary winding. A signal is applied to the stator primary, and it is sequentially transferred to the teeth secondary windings as the rotor poles sequentially align with the teeth during the rotation of the sensor rotor. The amplitude and phase of the outputs from the secondary windings are determinative of the angular position of the motor rotor. By proportioning the sensor structure so that the width of each rotor pole is equal to the width of a tooth plus the spacing between adjacent teeth, the output signals from the sensor have linear rise and fall rates, which are utilizable in the determination of the rate of rotation of the motor rotor. In order that rate information may be obtained for all positions of the rotor, the width of the teeth can be made equal to the spacing therebetween or the number of poles and teeth can be increased to the point where a linear rise or fall is occuring at, at least, one of the sensor outputs during a particular instant of time.

The sensor outputs are applied to a phase-sensitive bridge which includes a plurality of armature switches which drive the armature (stator) windings of the DC motor. The phase-sensitive bridge is responsive to the position information provided by the sensor to drive the armature windings both in the forward and reverse directions. The direction of rotation, in turn, is controlled by the phase of the excitation signal applied to the primary winding of the sensor. The rate information provided by the sensor is applied to other circuitry for developing a control signal which is also applied to the phase-sensitive bridge for providing an excitation-level modulation control of the armature current of the DC motor thereby resulting in controlled-damping and rate-limiting of the motor.

Background of the invention

This invention relates to apparatus for sensing the angular position and rate of rotation of a rotating object such as the rotor of a DC motor and, in particular, to integrated apparatus for accomplishing the above two functions.

Also this invention relates to a system for generating signals such as stator currents for a brushless DC motor of the type where an internal stator field is rotated 90° ahead in space of the rotor field, where the stator currents are derived from sensing apparatus, as mentioned above, which determines the position of the rotor.

Although there are many applications for DC motors of the type mentioned above, one particular application of importance arises in solar array reorientation systems where in the vacuum of outer space various problems arise which are avoided by a brushless, direct-drive system. Typical of the problems eliminated by such a system are (1) gear and lubrication problems, and (2) brush and commutator wear and friction, which substantially reduce system life and reliability.

The brushless DC motor contributes to the elimination of these problems. Typically, brushless DC motors utilize various switching networks to sequence current through the stator windings of the motor such that the stator magnetic field rotates in space 90° ahead of the rotor field produced by utilizing a rotor of permanent magnetic material. Sensor apparatus is required to detect the angular position of the rotor so that the stator field will remain in a 90° torque relationship with the rotor. Sensor apparatus is also required in solar array reorientation systems to detect the angular position and velocity of the rotor in a brushless manner with sufficient sensitivity so as to provide controlled-damping and rate-limiting of the solar array at orbital rates.

As can be appreciated from the above brief discussion of a solar array reorientation system, there are several distinct functions to be performed—namely, (1) position sensing of the rotor of the brushless motor, (2) velocity sensing of the rotor, (3) sequencing of current through the stator windings in response to the position sensing data and (4) controlled-damping and rate-limiting of the solar array. A fifth function may be added—that is, the reversible driving of the DC motor, which drives the array, in either direction. Because of the inherent space limitations in space vehicles, it is of paramount importance that these functions be accomplished in the smallest possible amount of space.

Minaturization of component size and weight usually necessitates operation of the sensor at the highest possible frequency and thus the frequency response of the sensor is of particular importance in space applications.

Summary

It is thus a primary object of this invention to provide an improved sensor for detecting the position of a rotating object such as the rotor of a brushless DC motor, the sensor having good frequency response; little inneraction between its outputs; and good angular resolution.

It is a further object of this invention to provide a sensor of the above type which has integrated therein the capability of also providing linear position and velocity information regarding the rotor of the motor, thereby reducing the space requirements for providing the position and velocity information.

It is a further object of this invention to provide a sensor of the above type where the linear position and velocity information is provided for all angular positions of the DC motor rotor.

It is a further object of this invention to provide improved circuitry for sequencing the stator current of a brushless DC motor, the same circuitry being utilizable for both forward and reverse directions of the motor thereby resulting in reduced space requirements for performing these functions.

It is a further object of this invention to provide improved sequencing circuitry, as above, the circuitry being responsive to a single control signal for providing controlled-damping and rate-limiting of the motor and the circuitry thus lending itself to further integration of functions.

It is a further object of this invention to include (1) the above-described improved position and rate sensing apparatus and (2) the above-described improved sequencing circuitry in a solar array reorientation system.

It is a further object of this invention to provide a sensor of the type which provides angular position and rate information for controlled-damping and rate limiting of a solar array at orbital rates.

The foregoing objects and others are accomplished by one illustrative embodiment of the invention, which includes a magnetic sensor for providing a continuous 360° coverage of position and rate information derived directly from the solar array output shaft. The sensor comprises (1) an easily magnetizable rotor having a plurality of poles disposed around the periphery thereof and (2) an easily magnetizable stator having a plurality of teeth disposed around the inner periphery thereof, the teeth being arranged in pairs where each member of a pair is disposed on the inner periphery of the sensor stator at a position offset from the point diametrically opposite from the other member of the pair. Connected to the main body of the stator is a primary winding to which exciting current is applied. This current is sequentially transferred through secondary windings, which are respectively placed around the stator teeth, as the rotor poles sequentially align with the teeth during the rotation of the sensor rotor. The amplitude and phase of the output signals from the sensor provide input signals to a phase-sensitive bridge, which, in turn, provides the stator current for the brushless DC motor, which drives the solar array.

Other features, objects, and advantages of the invention will become apparent from a reading of the following detailed description of an illustrative embodiment of the invention and the claims.

Detailed description of a preferred embodiment of the invention

In the several figures of the drawing, the use of common reference numerals indicate the same or similar elements.

Figure 1:
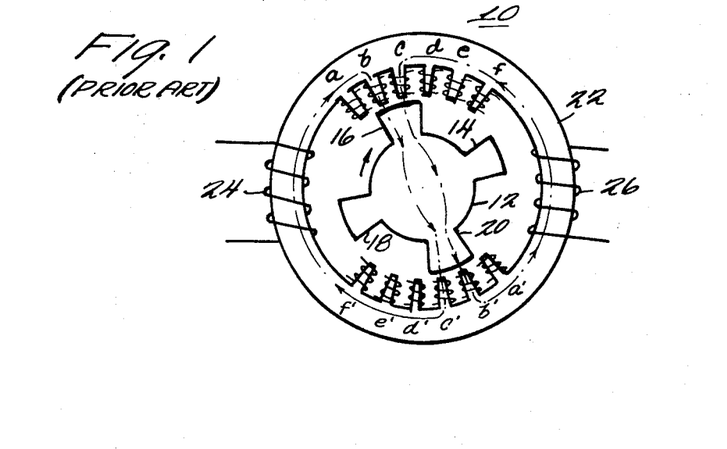
FIGURE 1 is a diagrammatic illustration of a prior art embodiment of a magnetic position sensor.

Referring to FIGURE 1, there is shown a prior art embodiment of a magnetic sensor 10 for detecting the position of a motor rotor or other rotating object, the rotor 12 of the sensor 10 being mounted on the same shaft as that for the motor rotor (not shown). The rotor includes a plurality of poles 14–20, disposed around the periphery thereof.

The sensor 10 also includes an annular stator 22 having a plurality of teeth $a$–$f$ and $a'$–$f'$ disposed around the inner periphery thereof where the teeth are arranged in pairs $a$–$a'$, $b$–$b'$, etc., each member of a pair being disposed on the inner periphery at a point diametrically opposite from the other member of the pair.

Exciting current is applied to the two halves 24 and 26 of the primary winding in opposition to each other so that flux is forced through the sensor teeth as shown by the directed lines passing through the rotor. Secondary windings are connected to each of the teeth where the windings for each pair $a$–$a$, $b$–$b'$, etc., are connected series aiding so that each pair constitutes a sensor output. Thus, representative pair $f$–$f'$, as shown in FIGURE 1, constitutes a senor output. Typically, the width of the rotor poles in relation to the width of the stator teeth and the spacing therebetween is such that the secondary windings are energized two pairs at a time, as the rotor rotates in the direction indicated by the arrow. Thus, when the rotor poles 16 and 20 are aligned with the teeth $b$–$b'$ and $c$—$c'$, as shown in FIGURE 1, output signals are produced on the corresponding secondary windings.

It has been experimentally established that the prior art sensor of FIGURE 1 has several shortcomings when used in various applications. Thus, this sensor has a limited high-frequency capability causing an undesirable lag of the output signals with respect to the exciting signal so as to degrade system performance. This lag is more severe with higher excitation frequencies. Since it is desirable to operate at higher frequencies in space vehicle applications and thereby reduce the size of the associated equipment, this shortcoming of the FIGURE 1 sensor can be significant.

Figure 2:
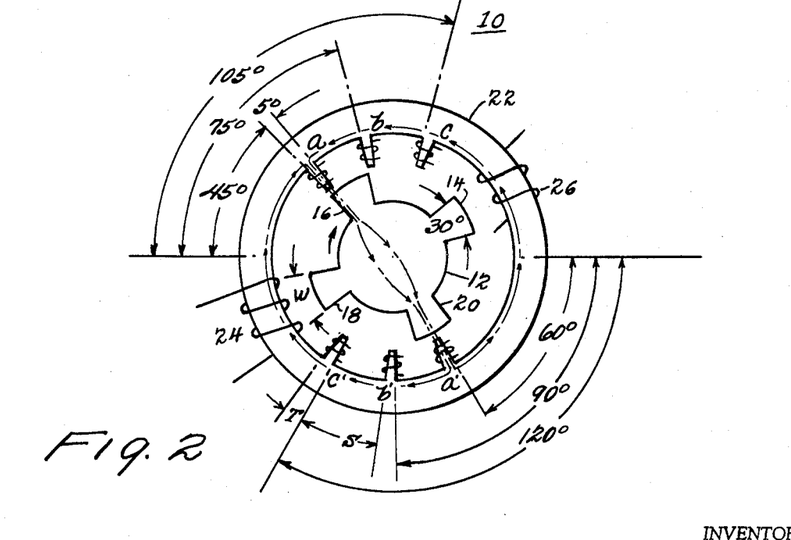
FIGURE 2 is a diagrammatic illustration of one of the preferred embodiments of the invention.

This limitation and others of the FIGURE 1 sensor are overcome by the sensor shown in FIGURE 2, which includes various features which distinguish it over the FIGURE 1 sensor, the dimensions shown in the figure being illustrative of one possible embodiment of the invention, while each of the stator teeth has a secondary winding as in FIGURE 1. Most importantly, the stator teeth are arranged in pairs $a$–$a'$, $b$–$b'$, $c$–$c'$, where each member of a pair is now offset from that point diametrically opposite from the other member of the pair. By this arrangement, essentially all of the primary winding flux links each active output secondary winding, thereby greatly increasing the magnetic coupling between primary and secondary windings.

Figure 3:
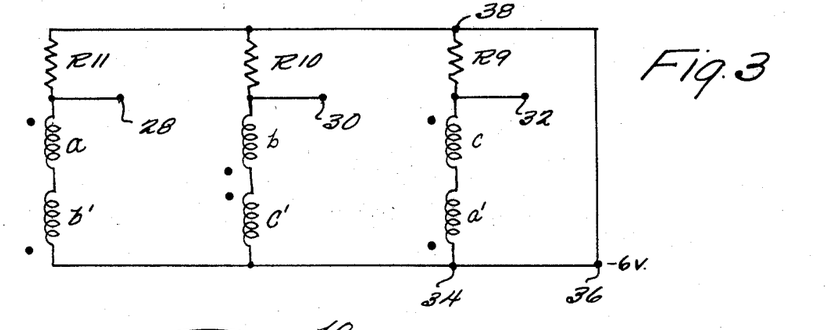
FIGURE 3 is a schematic diagram showing an illustrative relation between the stator teeth and the secondary windings of the sensor of FIGURE 2.
Figure 4:
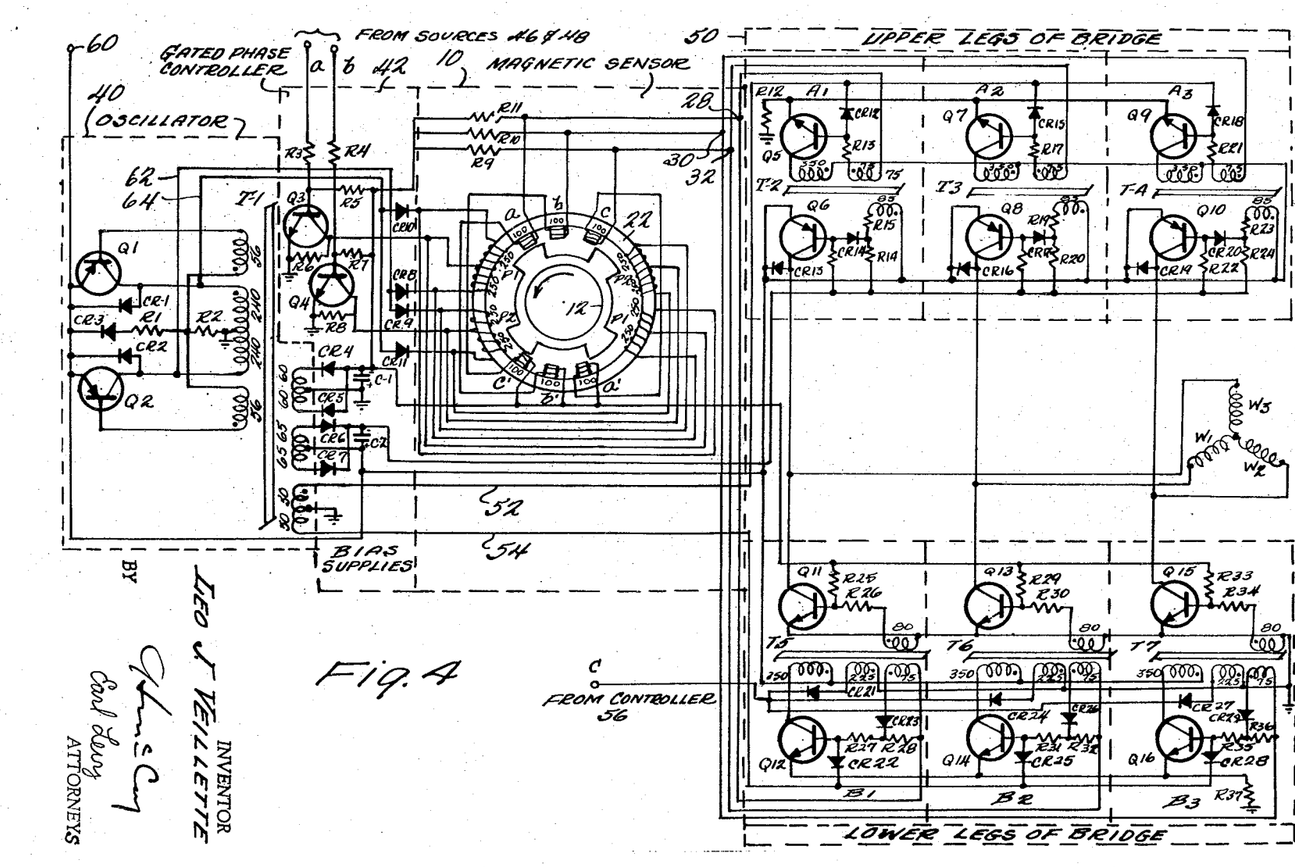
FIGURE 4 is a schematic diagram of (1) an illustrative controller-commutator in accordance with a further aspect of the invention and (2) a further preferred embodiment of a magnetic sensor.

In FIGURE 3, there is schematically shown a wiring diagram indicating a typical preferred relation between the secondary windings and the stator teeth of the magnetic sensor of FIG. 4, the dot positions adjacent the windings indicating the direction of induced flux. Thus, at each of the output terminals 28, 30, 32, there is present a signal, the amplitude and phase of which vary with time thereby providing the data necessary for the functioning of a system such as a solar array reorientation system. A common terminal 34 for the secondary windings is indicated in FIGURE 3, terminal 34 being connected to a source of DC voltage indicated at 36, which is also connected to common terminal 38. Typically the voltage of source 36 is −6 volts. Resistors R9, R10, and R11 (also see FIGURE 4) are so chosen as to provide critical damping of the winding resonances.

By proper proportioning of the sensor structure, various advantageous results can be achieved. Thus, by allowing the width in degrees or radians of the rotor poles, W, to approach the width in degrees or radians of the spacing between adjacent stator teeth, the sensor frequency response can be made indefinitely large for all angular positions of the rotor, and for arbitrarily large resistive loading. Thus, by selecting W sufficiently close to S (that is, let $W \rightarrow S$), the above results can be achieved. Hence, the magnetic sensor geometry sensor geometry $W \rightarrow S$ yields a nearly optimum sensor gain and bandwidth characteristic for commutation.

The sensor structure may also be proportioned so that the sensor output is linearly related to the rotor angular position. Hence, it is inherently capable of simultaneously providing (1) rotor position information for commutation purposes and (2) rotor position and rate information for control purposes. This result is accomplished by causing the rotor pole width, W, to be equal or approximately equal to the sum of the stator tooth width in degrees or radians, T, and the spacing between the teeth, S. That is, $W = S + T$, as shown in FIGURE 2.

Figure 5A:
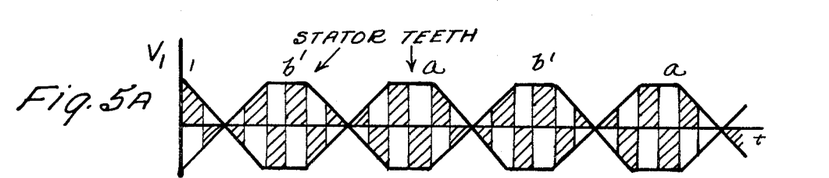
FIGURES 5A–5E illustrate the representative waveforms occurring at the output terminals of the sensor of FIGURE 4.
Figure 5B:
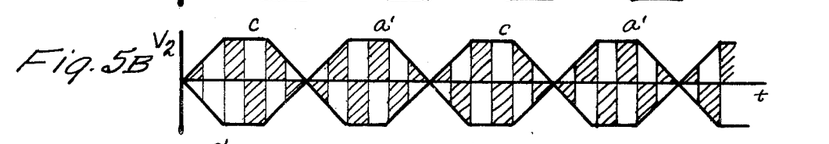
Figure 5C:
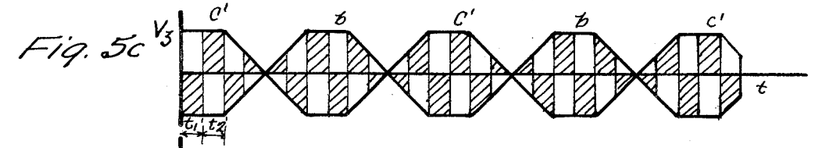

In order that the position and rate information can be obtained for all angular positions of the rotor, a further restriction is required—that is, S equals or approximately equals T. In FIGURE 4 (which will be described in more detail hereinafter), there is shown such a configuration and in FIGURES 5A–5C, there are shown the waveforms of the sensor output signals respectively occurring at terminals 28–32, see FIGURES 3 and 4. The envelops of these signals are also indicated to illustrate that a linear rising or falling portion of at least one of the output signals is occurring at any given angular position of the rotor. The stator teeth are indicated above those portions of the output signals associated therewith.

Since the position and velocity information is linear and available for all angular positions of the rotor, the FIGURE 4 rotor configuration $W = S + T$ and $S = T$ is particularly well suited for many applications. For some applications, particularly where extension of the linear range of position and velocity information is required, rather than having $S = T$, it may be desirable to have $S < T$. In direct-drive solar array control applications, a further requirement is high rate-sensitivity in order that the system be effective at very low shaft velocities in the vicinity of orbital rates. Rate-sensitivity can be increased by increasing the number of poles; however, this results in reduced tooth spacing with attendant restricted winding space and thus reduced angular resolution.

Figure 6:
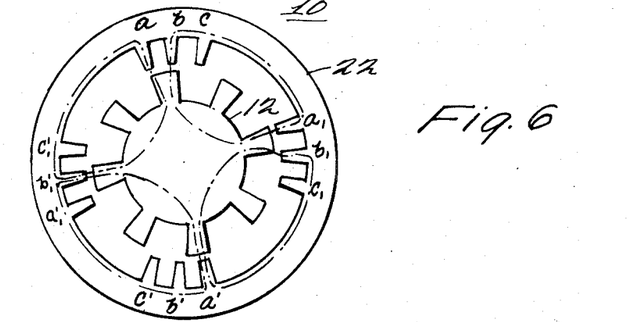
FIGURE 6 illustrates a further preferred embodiment of a magnetic position and velocity sensor.

Reconciliation of these difficulties is achieved by the sensor configuration of FIGURE 6. Logic tables showing the sensor output states as functions of rotor angular position, $\phi$, are given in FIGURES 7A and 7B, where FIGURE 7A applies to the FIGURE 4 sensor and FIGURE 7B applies to the FIGURE 6 sensor.

The structure of the FIGURE 6 sensor includes a further group of teeth with respect to the FIGURE 4 sensor—that is, group $a_1$, $b_1$, $c_1$, $a_1'$, $b_1'$, and $c_1'$. The teeth of this last group are also arranged in pairs where each member of a pair is offset from the position diametrically opposite the other member of the pair, as shown in FIGURE 6. Referring to FIGURE 7B, there is indicated (1) group A, which includes the teeth $a$, $b$, $c$, $a'$, $b'$, and $c'$ (having respective output signals $V_1$-$V_6$) and (2) group B, which includes teeth $a_1$, $b_1$, $c_1$, $a_1'$, $b_1'$, and $c_1'$ (having respective output signals $V_1'$-$V_6'$) where the members of group A are disposed substantially perpendicular to the members of group B as shown in FIGURE 6. The output signals may be taken from the 12 outputs from the FIGURE 6 sensor in any way which is convenient for the circuitry which operates on these output signals.

Figure 7A:
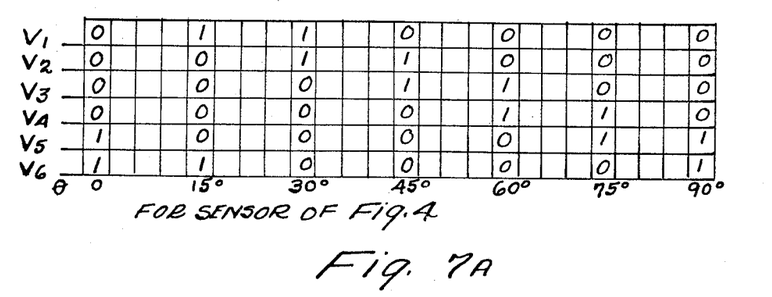
FIGURES 7A and 7B illustrate the excited states of the sensor output windings for the sensors of FIGURES 4 and 6, respectively, as a function of angular position.
Figure 7B:
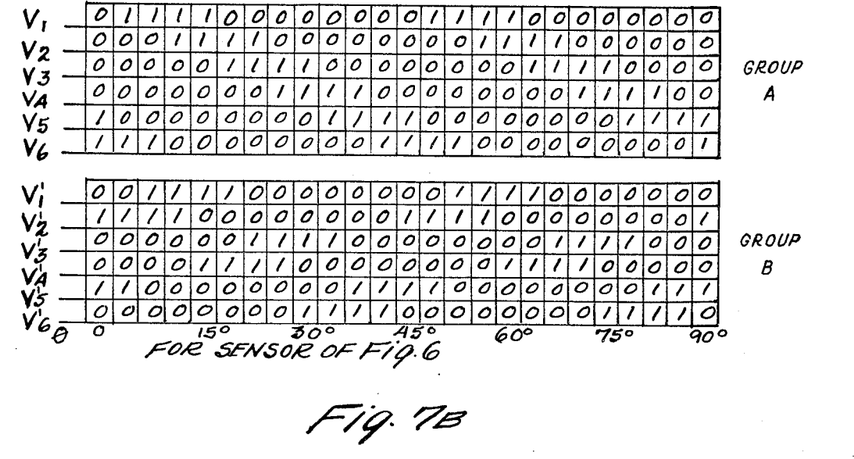

In FIGURES 7A and 7B, a "one" signifies the excited state of a given stator-tooth output winding and a "zero" signifies the unexcited state of a winding. Comparing FIGURES 7A and 7B, it is seen that the angular resolution of the FIGURE 6 sensor is four times better than that of FIGURE 4 while also providing improved rate-sensitivity. Both the FIGURE 4 and FIGURE 6 sensors offer flexibility in selecting the output winding directions and the interconnections to satisfy a wide range of commutation requirements. Further, both of these sensors (1) permit position and velocity sensing functions to be effectively integrated into a single device; (2) give 360° coverage of continuous position and rate data; and (3) produce an output signal whose amplitude is essentially a linear function of rotor angular position. The FIGURE 6 sensor in addition (1) possesses an increased angular resolution for commutation of brushless DC motors with 16 poles or more, (2) possesses an increased rate-sensitivity and has a configuration which is such that the winding distribution does not prematurely restrict sensor angular resolution and rate-sensitivity.

Figure 8:
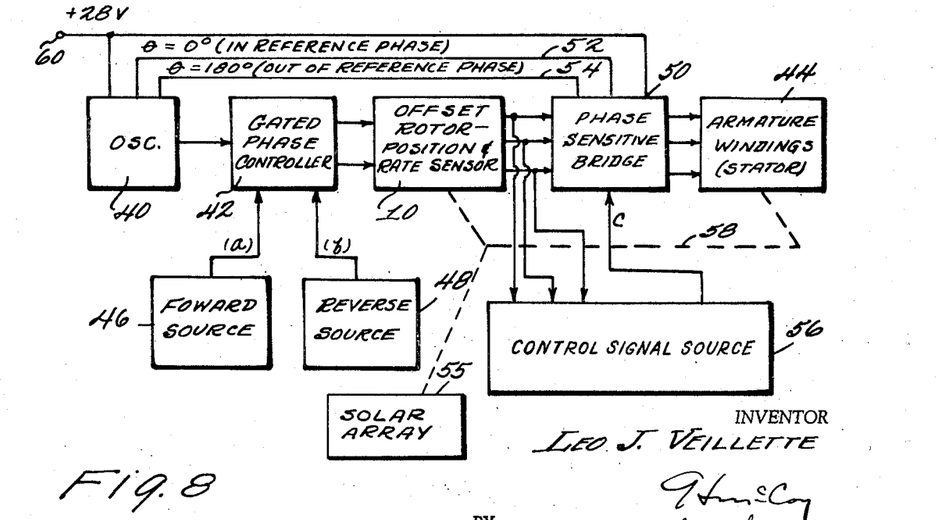
FIGURE 8 is a block diagram of the controller-commutator of FIGURE 4.

Referring to FIGURE 8, there is shown a block diagram of a controller-commutator for use in a system such as a brushless direct-drive solar array reorientation system. An oscillator 40 converts DC power to AC to drive the magnetic sensor 10. A gated phase controller 42 controls the phase of the output signals from the magnetic sensor to thereby determine the direction of the torque sequence applied to the stator windings 44 (which may be either delta or W connected) of the brushless DC motor. The controller 42 is regulated by a gating signal which is applied from either forward source 46 or reverse source 48. These sources respectively cause the torque sequence to be in the forward and reverse directions. Sources 46 and 48 determine the required direction of rotation of the DC motor, this circuitry not being a part of the invention is not shown.

Figure 5D:
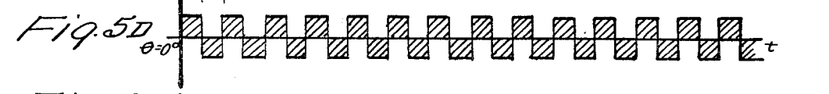
Figure 5E:
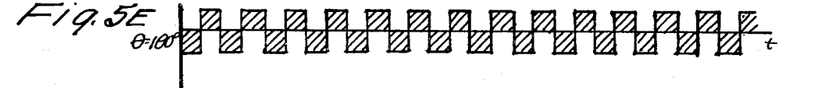

A phase-sensitive bridge 50 provides regenerative amplification of the sensor output signals and detects the phases of these signals and two reference signals applied over lines 52 and 54 from oscillator 40 to provide switching of the armature currents and thereby provide the required torque sequence for the motor. The reference signals are 180° out of phase with each other, the line 52 reference signal being designated the in-reference phase ($\phi = 0°$, see FIGURE 5D) and the line 54 signal the out-of-reference phase ($\phi = 180°$, see FIGURE 5E).

Phase-sensitive bridge 50 is also responsive to a control signal applied from control signal source 56, the level of this control signal determining the amount of controlled-damping and rate-limiting of the solar array 55, mechanically interconnected with sensor 10 and the rotor (not shown) associated with stator windings 44. Control signal source 56 is responsive to the position and velocity information provided by sensor 10 in order that the damping and limiting functions can be performed. In particular, a rate control function can be generated in response to either the position and velocity data provided by the sensor. The detailed construction of control signal source 56 is not given since such structures are well known to those of ordinary skill in this art.

The dashed line indicates the mechanical connection 58 (same shaft) between the DC motor, the solar array 55, and the sensor 10. The source 60 provides operating voltage for the circuitry, this voltage typically being +28 volts.

Reference should now be made to FIGURE 4, where the controller-commutator of FIGURE 8 is shown in schematic diagram. The dashed lines divide the circuit into sections that show implementation of each block of FIGURE 8.

Illustrative values or descriptions of the circuit components are given in the following table where all resistor values are in ohms. The number of turns of each transformer winding is indicated adjacent the winding in FIGURE 4. It should be understood that the invention is not limited to these particular values.

| Component: | Value or description |
|---|---|
| R1 | 750, ¼ w. |
| R2, R6, R8 | 22K, ½ w. |
| R3, R4 | 1.2K, ¼ w. |
| R5, R7 | 6.2K, ¼ w. |
| R9, R10, R11, R14, R18, R22 | 5.1K, ¼ w. |
| R12 | 150, ¼ w. |
| R13, R17, R21, R27, R31, R35 | 1K, ¼ w. |
| R15, R19, R23 | 82, ½ w. |
| R25, R29, R33 | 430, ½ w. |
| R26, R30, R34 | 75, ½ w. |
| R28, R32, R36 | 2K, ¼ w. |
| R37 | 180, ¼ w. |
| CR1, CR2, CR8–11, CR13, CR14, CR16, CR17, CR19, CR20 | IN658. |
| C1, C2 | 2.2 µf., 2 v. Ta. |
| CR3–7, CR12, CR15, CR18, CR21–29 | IN3070. |
| Q1, Q2 | 2N2882. |
| Q3, Q4 | 2N2034. |
| Q5, Q7, Q9, Q12, Q14, Q16 | 2N1893. |
| Q6, Q8, Q10 | 2N514. |
| Q11, Q13, Q15 | 2N2698. |
| All transformers | #38 wire. |
| Transformer windings | See FIGURE 4. |

Referring to oscillator 40 of FIGURE 4, the transistors Q1 and Q2 alternately conduct through transformer T1 and apply current through lines 62 and 64 to the two halves of primaries P1 and P2 connected to the stator 22 of sensor 10. Whether primary P1 or P2 is excited depends on whether Q3 or Q4 of the gated phase controller 42 is conducting. Either Q3 or Q4 will be conducting depending on which of lines $a$ and $b$ from sources 46 and 48 are actuated. If P1 is excited, then the conditions for forward rotation of the brushless DC motor are satisfied and if P2 is excited, for reverse rotation.

As stated hereinbefore, the two halves of P1 or P2 are so connetced to the stator 22 as to drive flux through the rotor 12 in same direction at any given instant of time. The output signals from the sensor occur at terminals 28–32 and are shown in FIGURE 5 where $V_1$, $V_2$, and $V_3$, respectively, occur at terminals 28–32. These signals are applied to phase-sensitive bridge 50 which includes three upper legs $A_1$, $A_2$, and $A_3$ and three lower legs $B_1$, $B_2$ and $B_3$.

A typical upper leg $A_1$ includes transistor Q5 and non-linear magnetic core T2 connected in backing oscillator configuration. This circuit has a loop-gain slightly greater than unity and thus it is essentially a "magnetic core Schmitt" circuit (MCS). This results in regenerative turn-on and turn-off thereby avoiding damage due to excessive heat dissipation in the armature switch Q6 at or near the commutation points. Hysteresis is made small so that regenerative drive is effectively controlled by the sensor output signal occurring at terminal 28. Operation of the MCS circuit is inhibited through diode CR12. However, when inphase reference signals (from oscillator 40 via line 52) are applied to the cathode of CR12 in-phase with the terminal 28 sensor signal, the MCS circuit is actuated when both of these signals go positive. The upper legs MCS circuit transistors Q5, Q7, and Q9 have a common emitter resistor R12 which permits only one of the upper leg armature switches Q6, Q8, and Q10 to be actuated, switch Q6, for example, being driven through diode CR14. Common emitter resistor R37 affects the lower legs $B_1$–$B_3$ in a similar manner.

The MCS circuit (transistor Q5 and transformer T2) drives armature switch Q6 only during one-half of each cycle of operation. However, continuous conduction of the upper leg switch Q6 is obtained by filtering the MCS output (not shown), using a full-wave version of the MCS circuit (not shown) or by employing armature switching transistor Q6 having a long minority carrier storage time (50 to 100 µsec., typically) to sustain conduction between successive half-cycle driving periods. As stated above, this situation also applies to the other upper leg switches Q8 and Q10.

However, referring to the lower legs $B_1$–$B_3$, an important additional feature is present. Note that the line $c$ from control signal source 56 is connected only to these legs and not upper legs $A_1$–$A_3$. Referring to typical lower leg $B_1$, the line $c$ is connected to a winding on T5 through dode CR21 is shown in FIGURE 4. The control signal applied from control signal source 56 regulates the reset level of core flux in the lower-leg MCS circuit (Q12, T5) of the bridge. This control signal limits the rate of flux reversal during the reset interval and CR21 decouples the control voltage from the core during the driving interval. Variation of the core flux reset level produces a corresponding variation of the armature switch conduction time so that pulse width modulation of the armature excitation is obtained. Since the period of oscillation is short compared to the torque motor winding time constant the windings filter out variations in the armature current so that excitation-level modulation control is achieved. The windings are indicated as $W_1$, $W_2$, and $W_3$ in the Y connection of FIGURE 4.

Figure 9:
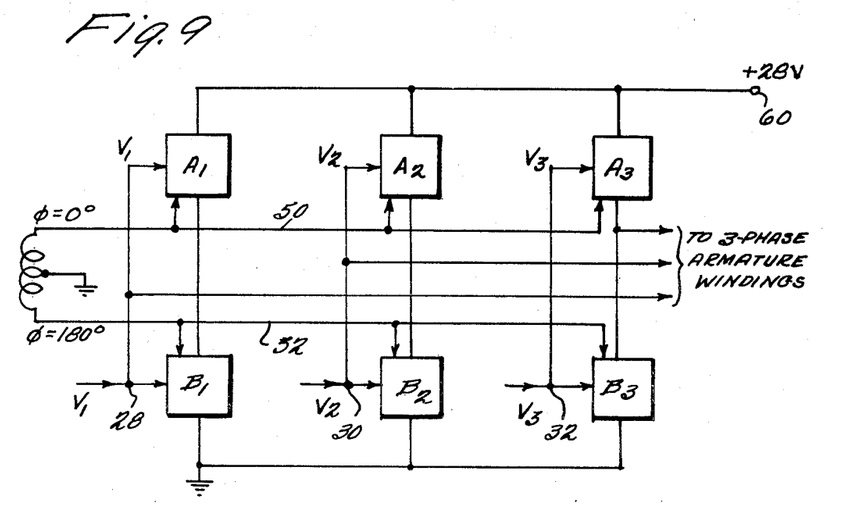
FIGURE 9 is a block diagram of the phase-sensitive bridge of the controller-commutator of FIGURE 4.
Figure 10:
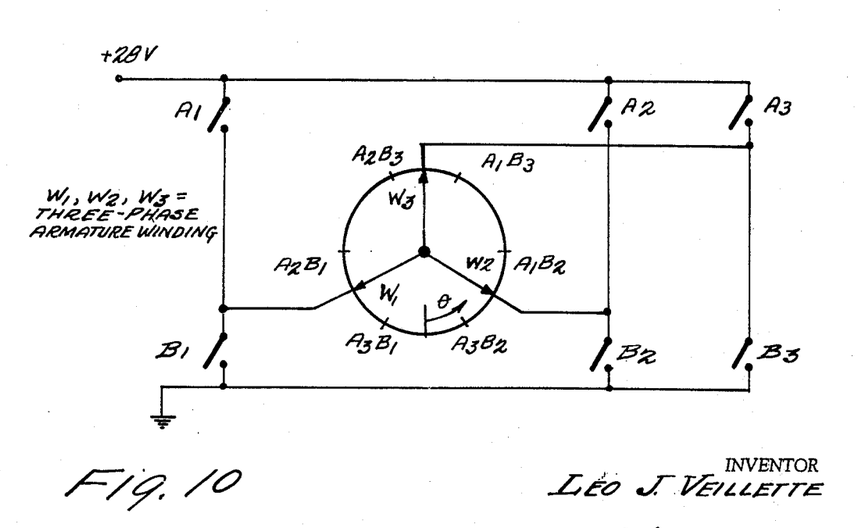
FIGURE 10 is a diagrammatic illustration of the armature windings and their associated switches as shown in the controller-commutator of FIGURE 4.

Having briefly described the circuitry and operation of the individual blocks of FIGURE 4, the overall operation of the controller-commutator will now be explained in reference to FIGURES 4, 5, 9, 10 and 11 where FIGURE 9 illustrates in block form the phase sensitive bridge 50 of FIGURES 4 and 8; FIGURE 10 diagrammatically illustrates the relation between the armature switches of the phase-sensitive bridge and the armature windings; and FIGURE 11 is a table depicting the relation between torque motor field position and armature switching sequences for optimum torque angle over the angular interval of 360 electrical degrees.

Referring to FIGURE 9, any one of the bridge legs $A_1$–$A_3$ and $B_1$–$B_3$ will be actuated whenever, the two signals applied thereto are in-phase and positive. Further, referring to FIGURES 10 and 11, the upper leg $A_1$ and the lower legs $B_3$ should be closed for a rotor field position of $30°<\phi<90°$. Thus, now referring to FIGURE 5, which shows the sensor output signals for forward-direction amplitude sequence and phase, and in particular to the time interval $t_1$, it can be seen that $V_1$ and $\phi=0°$ are in-phase and positive and thus $A_1$ of FIGURES 9 and 10 will close. Also, $V_3$ and $\phi=180°$ are in-phase and since for a given position of the sensor rotor they will both undergo a phase shift (both are AC signals) and they will both be positive thereby turning $B_3$ on a short time after $A_1$ has been turned on. As explained $A_1$ remains on because of the long minority carrier storage time of Q6 (see FIGURE 4) and thus $A_1$ will be on when $B_3$ is turned on. Hence, the conditions for the rotor field position of $30°<\phi<90°$ (see FIGURE 11) are satisfied at $t_1$ of FIGURE 5.

Figure 11:
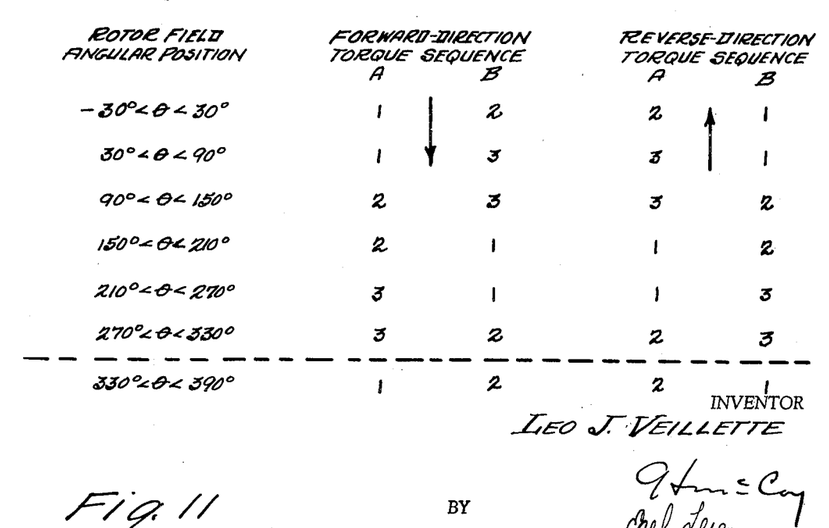
FIGURE 11 is a table depicting the relation between torque motor field position and armature switching sequence for optimum torque angle over the angular interval of 360 electrical degrees.

Stepping to $t_2$ of FIGURE 5, it will now be shown how this corresponds to the next rotor field position of FIGURE 11 for forward-direction torque sequence—that is, $90°<\phi<150°$. At $t_2$, $V_3$ and $\phi=180°$ are positive and in-phase (thereby turning on $B_3$) and also $V_2$ and $\phi=0°$ are in-phase and will eventually be positive (thereby turning on $A_2$ eventually) and thus the conditions for the rotor field position of $90°<\phi<150°$ are satisfield at $t_2$ FIGURE 5.

Reverse operation of the torque motor is achieved by reversing the phase of the magnetic sensor signals by gating the phase-controller 42 of FIGURE 8 over line $b$. Since the inhibit signals to the upper legs $A_1$–$A_3$ of the bridge are out-of-phase with the inhibit signals to the lower legs $B_1$–$B_3$ the roles of the upper legs and lower legs are interchanged and the reverse direction torque sequence is produced.

No additional phase-sensitive circuitry is required to obtain the bi-directional drive capability. This fact combined with the simplicity of the sensor winding and connection configurations, and the need for only a single magnetic sensor contribute substantially to reducing complexity of the controller-commutator design.

Numerous modifications of the invention will become apparent to one of ordinary skill in the art upon reading the foregoing disclosure. During such a reading, it will be evident that this invention has provided a unique magnetic sensor and circuitry for use in systems such as a brushless direct-drive solar array reorientation system and for accomplishing the objects and advantages stated herein. Still other objects and advantages, and even further modifications will be apparent from this disclosure. It is to be understood, however, that the foregoing disclosure is to be considered exemplary and not limitative, the scope of the invention being defined by the following claims.

What is claimed is:

1. Apparatus for sensing the angular position of a rotating object, said object being mounted on a rotatable shaft, said apparatus comprising:
   (1) a rotor connected to said shaft, said rotor including a plurality of poles disposed around the periphery of said rotor, the width of each of said poles in angular measurement being W,
   (2) an annular stator having a plurality of teeth disposed on the inner periphery of said stator, said teeth being arranged in pairs where each member of a pair is offset from the point diametrically opposite from the other member of the pair, the width of the teeth in angular measurement being T and the spacing between adjacent teeth in angular measurement being S, said rotor being disposed within said stator,
   (3) at least one primary winding connected to said stator responsive to an exciting signal; and
   (4) a plurality of secondary windings respectively wound around said plurality of stator teeth so that flux generated by said exciting current links each secondary winding as the tooth associated with that secondary winding aligns with one of the rotor poles during the rotation of the rotor.

2. Apparatus as in claim 1 where $W \rightarrow S$ thereby optimizing the gain and bandwidth of said sensor for commutation purposes when said rotating object is the rotor of a brushless DC motor.

3. Apparatus as in claim 1 where W equals or approximately equals $S+T$ thereby providing said sensor with the capability of providing rotor position and velocity information.

4. Apparatus as in claim 3 where S equals or approximately equals T thereby extending said capability to all angular positions of said rotor.

5. Apparatus as in claim 1 where said teeth are arranged in at least two groups where the members of said first group of teeth are disposed in a direction substantially perpendicular to the members of said second group of teeth.

6. A system for controlling a brushless DC motor of the type where an internal stator field is rotated in space 90° ahead of the rotor field, said system comprising:
   (1) a sensor for detecting the angular position of said motor rotor, said sensor including:
      (a) a rotor connected to said motor rotor, said sensor rotor including a plurality of poles disposed around the periphery of the sensor rotor, the width of each of said poles in angular measurement being W,
      (b) an annular stator having a plurality of teeth disposed on the inner periphery of the sensor stator, said teeth being arranged in pairs where each member of a pair is offset from the point diametrically opposite from the other member of the pair, the width of the teeth in angular measurement being T and the spacing between adjacent teeth in angular measurement being S, said sensor rotor being disposed within said sensor stator,
      (c) at least one primary winding connected to said sensor stator,
      (d) a plurality of secondary windings respectively wound around said plurality of sensor stator teeth so that flux generated in said primary winding links each secondary winding as the tooth associated with that secondary winding aligns with one of the sensor rotor poles during the rotation of the sensor rotor,
   (2) means for driving said primary winding with exciting current to generate said flux; and
   (3) means responsive to the output signals generated at said secondary windings of the sensor for providing the motor stator current to generate said internal stator field.

7. A system as in claim 6 including means for controlling the phase of the said exciting current applied to the primary winding to thereby control the phase of the said sensor output signals, said means for providing the motor stator current including means responsive to the phase of the sensor output signals for controlling the direction of rotation of said motor rotor.

8. A system as in claim 6 where said means for providing the motor stator current includes means for providing controlled-damping and rate-limiting of said DC motor, wherein said sensor W equals or approximately equals $S+T$ so that said sensor provides information on the position and velocity of said motor rotor, and where said system includes means responsive to said position and velocity information to provide a control signal which regulates said means for providing controlled-damping and rate-limiting of the motor.

9. A system as in claim 8 where S equals or approximately equals T so that said velocity information is provided for all angular positions of said motor rotor.

10. A system as in claim 6 wherein said means for providing the motor stator current includes a bridge circuit responsive to the amplitude and phase of the said sensor output signals, said bridge circuit including a plurality of legs respectively connected to said plurality of sensor secondary windings, said legs being evenly divided into upper and lower groups, each said leg including a magnetic core Schmitt (MCS) circuit.

11. A system as in claim 10 where each of said MCS circuits of said lower group of legs includes means for regulating the duty cycle thereof in response to a control signal applied thereto, wherein said sensor W equals or approximately equals $S+T$ so that said sensor also provides information on the velocity of said motor rotor, and where said system includes means responsive to said position and velocity information for providing said control signal for said means for regulating the duty cycle of said lower group of MCS circuits, whereby controlled-damping and rate-limiting of said DC motor is provided.

12. A system as in claim 11 where said legs respectively include a plurality of switching means respectively connected to the plurality of MCS circuits for sequentially switching said motor stator current through the motor stator windings, the switching means of the upper group of legs being transistor having a long minority carrier storage time so that said switching means remain turned on after they have been actuated by their respective MCS circuit.

13. A system as in claim 12 where said stator winding is connected in Y configuration and where each portion of said stator winding is connected in series with (1) at least one of said switching means from said upper group of bridge circuit legs and (2) at least one of said switching means from said lower group of bridge circuit legs.

14. A system as in claim 10 including means for producing two out-of-phase reference signals, the first of said two reference signals being applied to said MCS circuits of said upper group of bridge circuit legs and the second being applied to said MCS circuits of the lower legs each of said MCS circuits being actuated when its sensor and reference signals are in-phase so that all of said MCS circuits are sequentially actuated.

15. A system as in claim 14 including means for controlling the phase of the said exciting current applied to the sensor primary winding to thereby control the phase of the said sensor output signals so that the sequence of actuation of said MCS circuits may be reversed thereby providing a capability of regulating the direction of rotation of said motor rotor.

16. A system as in claim 6 including a solar array where said system provides a brushless, direct-drive, reorientation of said solar array.

17. Apparatus as in claim 1, wherein substantially all of said flux links said secondary winding.

18. Apparatus as in claim 6, wherein substantially all of said flux links said secondary winding.

References Cited

UNITED STATES PATENTS

| | | | |
|---|---|---|---|
| 3,091,728 | 5/1963 | Hogan et al. | 318—138 |
| 3,281,629 | 10/1966 | Le Tilly et al. | 318—254 |
| 3,305,713 | 2/1967 | Ikegami | 318—138 |
| 3,307,091 | 2/1967 | Johannes | 318—138 |
| 3,377,535 | 4/1968 | Yasuoka et al. | 318—138 |

G. R. SIMMONS, Primary Examiner

U.S. Cl. X.R.

324—70; 318—254